July 1, 1930.  G. E. BARNHART  1,769,049
FUEL RESERVE APPARATUS FOR FUEL TANKS
Filed Oct. 14, 1926
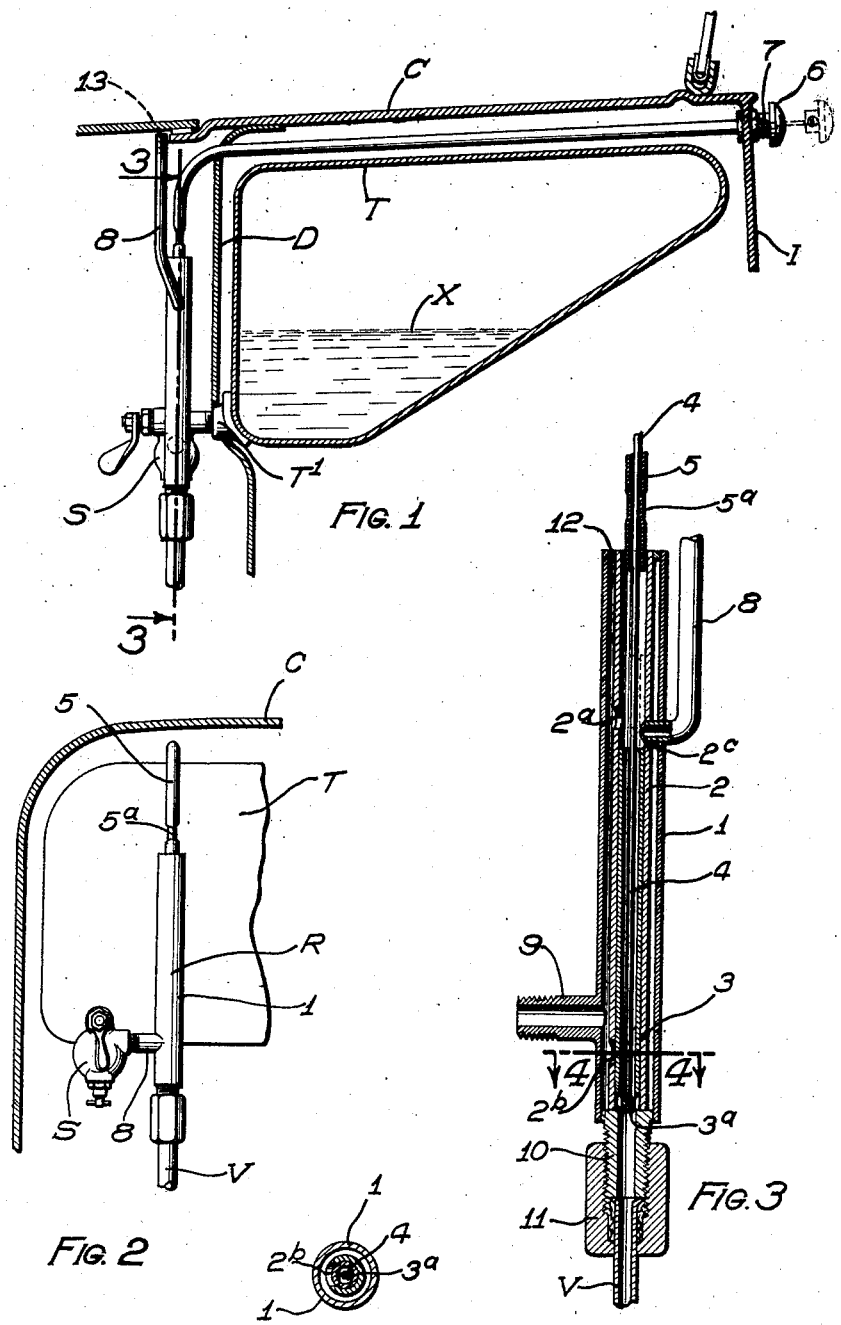
INVENTOR.
GEORGE E. BARNHART
BY A. B. Bowman
ATTORNEY Patented July 1, 1930

1,769,049

UNITED STATES PATENT OFFICE

GEORGE E. BARNHART, OF PASADENA, CALIFORNIA

FUEL-RESERVE APPARATUS FOR FUEL TANKS

Application filed October 14, 1926. Serial No. 141,643.

My invention relates to a fuel reserve apparatus for fuel tanks, more particularly for vehicle fuel tanks.

The objects of my invention are: first, to provide an apparatus of this class which can be readily applied to the outside of certain types of conventional vehicle fuel tanks without change of construction of the latter for converting a portion of the ordinary tank into a reserve compartment, or tank to be drawn on when desired by the operator and by a slight adjustment of the apparatus; second, to provide an apparatus of this class which may be applied to conventional vehicle fuel tanks by merely removing a single fitting connecting the fuel tank with a feed line and substituting my apparatus in its place; third, to provide an apparatus of this class which may be applied to the fuel tank of either a vacuum or gravity feed system of vehicles; fourth, to provide an apparatus of this class which, although positioned outside of the conventional tank, will not interfere in any way with the functioning of the tank or adjacent apparatus; fifth, to provide a compact tubular fuel reserve apparatus, adapted to be mounted on the outside of a fuel tank, and in which only a small amount of fuel is required for perfect functioning, and which will not materially interfere with the flow of the fuel from the tank into the feed system; sixth, to provide as a whole a novelly constructed apparatus of this class; and, seventh, to provide an apparatus of this class which is particularly simple and economical of construction, durable, efficient in its action and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a transverse sectional elevational view of a conventional vehicle fuel tank, showing my fuel reserve apparatus connected to the lower portion thereof and extended with its control portion to the instrument board of the vehicle, the control portion being shown by dotted lines as shifted to its outer position; Fig. 2 is a fragmentary elevational view of the tank and my fuel reserve apparatus, showing the the relation of the same to the cowl and hood of an automobile; Fig. 3 is an enlarged sectional elevational view of the main portion of my apparatus shown separate and apart from the fuel tank, the section being taken through 3—3 of Fig. 1; Fig. 4 is a transverse sectional view thereof, taken through 4—4 of Fig. 3.

Like characters of reference refer to similar parts and portions throughout the several views of the drawings.

The illustration of the fuel tank and its relation to adjacent parts of the automobile, as illustrated in Figs. 1 and 2, is similar to that of automobiles now in common use. However, my invention is not limited to such tanks and such arrangement. As will be seen in the illustration, the fuel tank T is mounted directly below the cowl C and between the dash board D and the instrument board I of the automobile. At the bottom portion of the tank T is provided an outlet $T^1$ to which is conventionally connected a sediment trap S of any suitable construction. Said sediment trap is usually directly connected, by means of an L fitting, with the fuel feed line V connected with the vacuum tank.

In my construction, the above mentioned L fitting is eliminated and by fuel reserve apparatus, indicated by R, substituted and connected with the sediment trap and with the fuel feed line V.

My fuel reserve apparatus consists essentially of an outer tube 1, an inner tube 2, a tubular valve 3, a Boden cable wire 4, a Boden cable tube 5, a knob 6, a screw 7, and an air breather tube 8.

The outer tube 1 is provided near its lower end with a side outlet connection 9 which is externally threaded and connected with the outlet of the sediment trap S. The lower end of the tube 1 is provided with a downwardly extending, externally threaded portion 10 which is adapted to be connected, by means of a coupling 11, with the one end of the vacuum feed line V. Positioned concentrically within the outer tube 1, is the inner tube 2 which extends to the shoulder formed by the connecting portions 10, as shown best in Fig. 3. The space between the tubes 1 and 2 may be sealed at the upper end by an annular member 12 which may be formed by turning in the upper end of the outer tube 2. Near the upper end of the tube 2, is provided a port $2^a$ which is adapted to ordinarily permit all fuel in the tank T above the level of the port $2^a$, as indicated by the line designated X in Fig. 1, to flow through the connection 9, the space between the tubes 1 and 2, through the tube 2, and into the feed line.

Near the lower end of the tube 2 is provided another port $2^b$ which, when desiring to have the fuel tank function also as a reserve tank, is covered by means of a tubular valve 3. Said tubular valve is preferably provided at its lower end with a cross portion $3^a$ to which is secured the one end of the Boden control cable wire 4. Said wire 4 extends upwardly through said valve, through the tube 2, into and through the Boden control cable tube 5, and is secured at its opposite end, by means of a screw 7, to an apparatus control knob 6. The Boden control cable tube 5 is secured at its one or forward end to the upper end of the tube 2 and sealed relative thereto, and is secured at its opposite end, in any suitable manner, to the instrument board I. The portion of the cable tube 5, immediately above the tube 2, is constricted, as indicated by $5^a$, to retain the fuel within the tube 2, and also to prevent air from passing into the same and eventually breaking the vacuum seal. It will be here noted that a constriction, or stuffingbox of any desired construction may be used to seal the space between the wire 4 and the tube 5. In the side wall of the tube 2 is provided another opening $2^c$ which is preferably positioned slightly lower than the port $2^a$ so that all the fuel may be drained from the tank below the level of the lower portion of the port $2^a$. To the opening $2^c$ is connected the breather tube 8 which is extended upwardly to preferably above the tank T. At the upper end of the tube 8 is provided a check valve 13 to prevent the fuel from flowing out of the upper end of said tube, or a tiny vent may be used.

When the fuel within the tank T reaches a level below the port $2^a$, as indicated by X in Fig. 1, air is drawn inwardly through the tube 8, the vacuum seal is broken and fuel fails to pass through the port $2^a$. The obvious stopping or sputtering of the motor will indicate to the operator to draw on the reserve fuel. The operator then withdraws the knob 6 from the solid to the dotted line position, shown in Fig. 1. Thus the valve 3, which is of considerable length, is drawn upwardly to the dotted line position, shown in Fig. 3, covering the opening $2^c$, uncovering the port $2^b$ and permitting the remaining fuel from the tank to be withdrawn. The dangling of the knob 6 at the end of the Boden cable wire 4 will continuously remind the operator that he is drawing on his reserve fuel supply and will notify him to replenish his fuel supply in the tank. The identical aparatus described is applicable to a gravity feed system such as used in certain types of vehicles. If desired, the breather tube may be connected with the upper portion of the tank.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a reserve apparatus of the class described, the combination with a tank having an outlet at its lower portion, of a tube provided near its lower end with means for connecting the same to the outlet of said tank, another tube positioned within the former and provided near its upper and lower ends with ports adapted to connect the same with the space between the same and the outer tube, said space being adapted to be continuously connnected with said tank and the interior of said second tube being adapted to be continuously connected with a feed line, and a valve member reciprocally mounted at the lower end of said second tube and wholly within the first tube and adapted to normally cover the port at the lower end of the second tube.

2. In a reserve apparatus of the class described, the combination with a tank having an outlet at its lower portion, of a tube provided near its lower end with means for connecting the same to the outlet of said tank, another tube positioned within the former and provided near its upper and lower ends with ports adapted to connect the same with the space between the same and the outer tube, said space being adapted to be continuously connected with said tank and the interior of said second tube being adapted to be continuously connected with a feed line, a valve member reciprocally mounted at the lower end of said second tube and wholly within the first tube and adapted to normally cover the port at the lower end of the second tube, a flexible control tube connected with the upper end of said second tube and extending to within reach of the operator of the vehicle on which the tank is mounted, and a control wire connected to said valve and extending through said flexible control tube, the portion of the latter tube adjacent said second tube being constricted around said wire.

3. In a reserve apparatus of the class described, the combination with a tank having an outlet at its lower portion, of an outer tube having a side outlet near its lower end connected with the outlet of said tank and provided with another outlet at its lower end adapted to be connected with a feed line, an inner tube positioned within the outer tube and spaced therefrom, said inner tube being connected near its upper and lower portions with the space between the same and said outer tube and at its lower end continuously with a feed line for supplying fluid to the same, and a tubular valve, of a length shorter than the outer tube reciprocally mounted at the lower portion of said inner tube adapted to normally seal the connection between the inner tube and the space between the inner tube and the outer tube.

In testimony, whereof, I have hereunto set my hand at Los Angeles, California, this 4th day of October, 1926.

GEORGE E. BARNHART.